(No Model.)
R. LUNDELL.
ALTERNATING ELECTRIC MOTOR.
No. 560,591. Patented May 19, 1896.
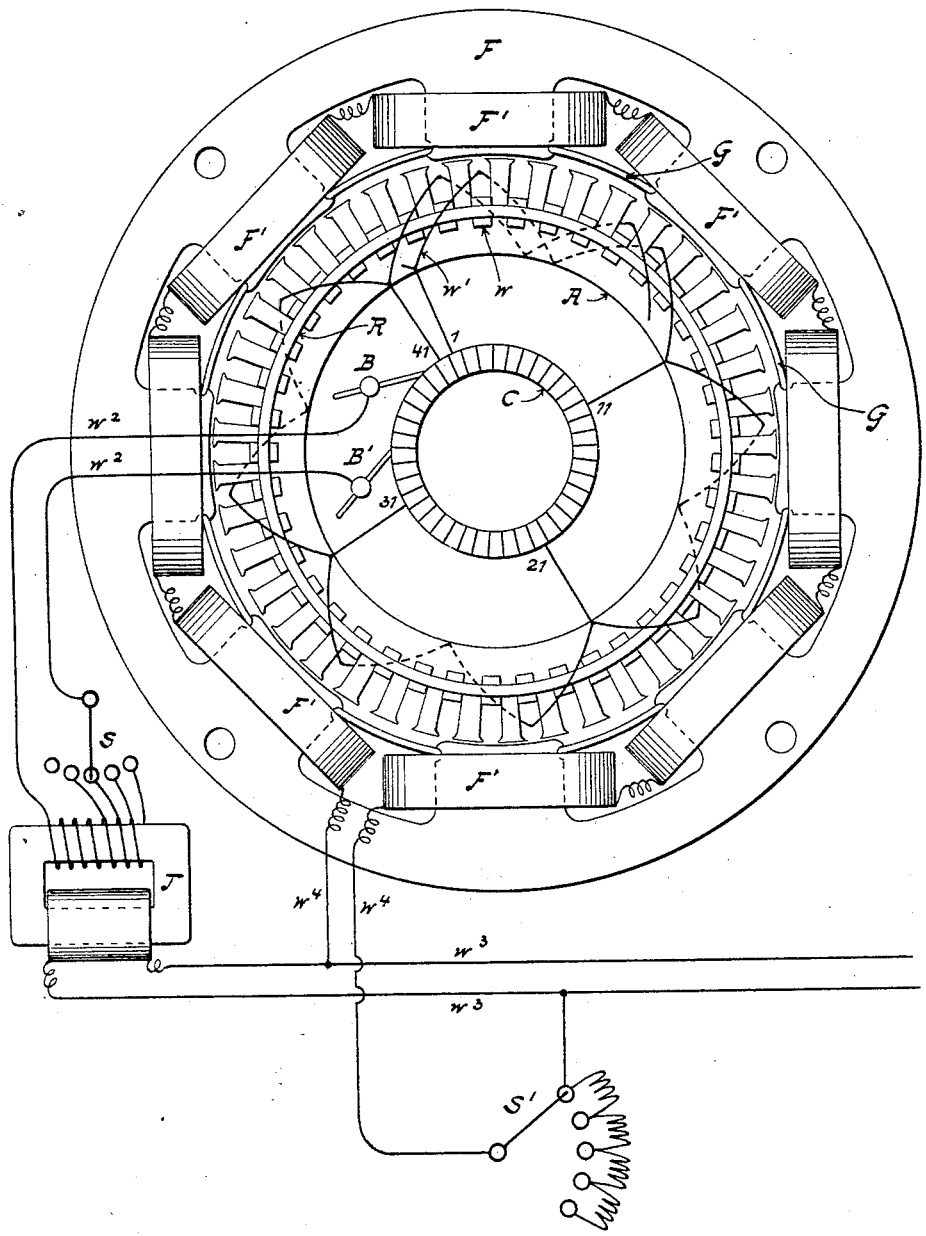
Witnesses
Eugene R. Pommer.
Osea H. Short.
Inventor
Robert Lundell
By his Attorney
Charles J. Kintner

UNITED STATES PATENT OFFICE.

ROBERT LUNDELL, OF BROOKLYN, NEW YORK, ASSIGNOR TO THE ELECTRIC EXPERIMENTAL AND DEVELOPING COMPANY, OF NEW YORK, N. Y.

ALTERNATING ELECTRIC MOTOR.

SPECIFICATION forming part of Letters Patent No. 560,591, dated May 19, 1896.

Application filed February 18, 1895. Serial No. 538,779. (No model.)

*To all whom it may concern:*

Be it known that I, ROBERT LUNDELL, a citizen of the United States, residing at Brooklyn, in the county of Kings and State of New York, have made new and useful Improvements in Alternating or Pulsating Current Electric Motors, of which the following is a specification.

My invention has for its objects, first, the construction of an alternating or pulsating current electric motor which is adapted to start under full load or torque; second, to provide means for the bringing of the armature or rotary part of an alternating or pulsating current electric motor to synchronism through the agency of the current which propels the motor after synchronism is reached and to effect this starting by the exercise of a minimum amount of electrical energy; third, to devise means whereby the short-circuited coils of an armature in an alternating or pulsating current electric motor permits of the use of currents of low voltage in additional open-circuited starting-coils, carried also by the armature and connected through commutator-brushes to a source of current supply adapted to generate such low-voltage currents, whereby objectional sparking is avoided at the commutator; fourth, to provide simple and efficient means for maintaining the field-magnet coils in position and permit of their easy removal for examination or repairs; fifth, to construct an alternating or pulsating current electric motor possessing any and all of the advantageous features necessarily attributable to the entire structure hereinafter described, the essential points of novelty of my improvements being particularly pointed out in the claims at the end of this specification.

The accompanying drawing is a diagrammatic view illustrating an alternating or pulsating current electric motor embodying my improvements and showing also the circuit connections between said motor and a pair of current-mains running to an alternating or pulsating source of current supply. (Not shown.)

Referring now to the drawing in detail, F represents an ordinary laminated eight-pole field-magnet provided with coils F' F', &c., all connected together in series, as shown. Said coils are held in place by sheets of non-conducting material G G, &c., which sheets are forced into notches extending across the inner ends of the field-magnet poles after the coils are slipped on.

A represents the armature, which is built up of thin sheet-iron in the usual well-known ordinary manner. It is provided with extra deep slots for the purpose of receiving two separate sets of windings. The first set of these windings consists of heavy copper bars $w$ laid in the bottom of the slots and connected at each end to stout copper rings R, as in well-known short-circuited armatures. The other winding $w'$ is preferably placed on top of the winding $w$ and consists of several turns of wire per section, although in the figure only one turn is shown in order to simplify the illustration. The different sections are connected according to well-known rules for multipolar drum-windings, and, as illustrated, only two brushes are needed, as the coils are all in series, the connections being 1 11 21 31 41, &c., as clearly indicated.

C is the commutator, having forty-one (41) sections, and B B' are the brushes, preferably made adjustable and so arranged that their contacting ends can readily be lifted off the commutator.

$w^2$ $w^2$ are conductors connecting the brushes with the secondary winding of a small transformer T, said winding being divided into several sections for the purpose of varying the electromotive force and applied to the brushes. The primary coil of the transformer T is connected with the current-mains $w^3$ $w^3$, which come from any suitable source of alternating or pulsating currents. (Not shown on the drawing.) The wires $w^4$ $w^4$, leading to the field-magnet coils F' F', are in the drawing connected direct to the current-mains $w^3$ $w^3$, this arrangement being sufficient in small motors on account of the self-induction of the field-magnet coils. In larger motors it will, however, be necessary to connect suitable starting-coils in series with the field-coils to prevent an injurious amount of current at the start or before the motor has reached its proper speed, as shown at S' in the drawing.

The action of this improved form of apparatus is as follows: Suppose alternating or pulsating currents are energizing the field-magnet poles alternately north and south, and suppose the secondary winding of the transformer is left open for the present. There will then be induced in the armature strong poles under the pole-pieces and there will be more or less repulsion between the armature and the field-magnet poles. The forces are, however, at equilibrium and no rotation will ensue unless the armature is first started and brought up to a certain speed. The repulsive poles in the armature are in this event no longer immediately under the pole-pieces, but are slightly in advance or to one side of the same, and if free to rotate the armature will speed up until nearly synchronous speed is reached. To effect the necessary starting-torque, the winding $w'$ is furnished with a strong magnetizing-current from the starting-transformer T. The brushes B B' are so placed on the commutator that the armature polarity induced from the winding $w'$ is midway between the field-magnet poles. The short-circuited winding $w$ practically annuls the counter electromotive force of the winding $w'$, and it is an easy matter to force a strong current from the secondary coil of the transformer T through the winding $w'$. The electromotive force applied at the brushes is comparatively so small that only a small per cent. of the total energy is absorbed in producing a strong armature polarity. This polarity is, as before stated, midway between the pole-pieces and produces in consequence a great torque. In fact the motor starts off almost like a direct-current motor. It will be understood that when the armature has reached approximately synchronous speed the currents in both windings $w$ and $w'$ are working in unison, tending to keep the polarity stationary in the armature-core.

If it is desired to have the motor run as a plain induction-motor, this can now be done by opening the switch S or by lifting the brushes B B' off the commutator C. The torque will, however, be much greater if the circuits are left undisturbed. Owing to the small difference of potential between the consecutive commutator-segments there is practically no sparking at the brushes and the motor runs to all appearances like a shunt-wound direct-current motor. The short-circuited armature-winding shown is a simple one and answers all practical purposes for small motors, but for larger motors short-circuited coils coinciding in shape to the coils of the winding $w'$ are preferable.

I do not limit myself to the particular details of construction herein shown and described for effecting the starting of the rotary part of an alternating or pulsating current electric motor having a short-circuited armature under full load or torque, as I believe I am broadly entitled to a method of effecting such rotation by the establishment of repellent poles in the armature or rotary part at one side or between the poles of the field-magnet or stationary part through the agency of additional induced currents set up in additional open-circuited coils carried by the armature, which induced currents are of such low voltage as to prevent sparking at the commutator-brushes and require a minimum amount of electrical energy in the effecting of said result, and my claims include, broadly, therefore the application of this generic principle without relation to any special form of apparatus, that shown in the drawing and hereinbefore described being the best now known to me.

Having thus described my invention, what I claim, and desire to secure by Letters Patent of the United States, is—

1. An alternating or pulsating current electric motor having an armature or rotary part provided with two sets of windings, one set being short-circuited or closed upon itself and the other connected through a commutator or current-collecting device to the secondary of a converter, the primary of which is connected directly to the current-mains the field-magnet coils being also connected directly to said current-mains.

2. An alternating or pulsating current electric motor having field-magnet coils and a short-circuited armature, with additional armature-coils having circuit connection with a source of current supply adapted to generate currents of low voltage the field-magnet coils being connected directly to the current-mains.

3. An alternating or pulsating current electric motor having its field-magnet coils connected directly to a primary source of alternating or pulsating current supply, and a closed-circuited armature provided with additional coils connected to the secondary of a converter, the primary of which is connected to the same source of current supply.

4. An alternating or pulsating current electric motor having its field-magnet coils connected directly to a source of current supply and its armature provided with two sets of windings, one set of said windings being connected to the secondary of an independent converter, the primary of which is connected to the same source of current supply.

In testimony whereof I have hereunto subscribed my name this 16th day of February, 1895.

ROBERT LUNDELL.

Witnesses:
C. J. KINTNER,
M. M. ROBINSON.